US008169919B2

(12) United States Patent
Suh et al.

(10) Patent No.: US 8,169,919 B2
(45) Date of Patent: May 1, 2012

(54) TERMINAL DEVICE AND RELAY NODE SELECTION METHOD OF TERMINAL DEVICE

(75) Inventors: Jung Hoon Suh, Suwon-si (KR); Sung Jin Kim, Suwon-si (KR); Young Chai Ko, Seoul (KR); Kyu Sung Hwang, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 219 days.

(21) Appl. No.: 12/546,743

(22) Filed: Aug. 25, 2009

(65) Prior Publication Data

US 2010/0238816 A1 Sep. 23, 2010

(30) Foreign Application Priority Data

Mar. 17, 2009 (KR) .................. 10-2009-0022661

(51) Int. Cl.
*H04L 12/28* (2006.01)
*G01R 31/08* (2006.01)
*H04W 4/00* (2009.01)
*H04B 17/02* (2006.01)

(52) U.S. Cl. ......... 370/241; 370/351; 370/332; 455/135
(58) Field of Classification Search .................. 370/315, 370/328, 329, 335, 330, 331, 332, 318, 320, 370/241, 351; 455/13.1, 16, 7, 8, 9, 63.1, 455/524, 525, 67.11, 11.1, 15, 135, 136
See application file for complete search history.

(56) References Cited

U.S. PATENT DOCUMENTS

| | | | | |
|---|---|---|---|---|
| 7,720,020 | B2 * | 5/2010 | Larsson | 370/315 |
| 7,746,827 | B2 * | 6/2010 | Xue et al. | 370/332 |
| 7,933,549 | B2 * | 4/2011 | Larsson | 455/7 |
| 7,944,871 | B2 * | 5/2011 | Imamura et al. | 370/315 |
| 2008/0144512 | A1 | 6/2008 | Molisch et al. | |

FOREIGN PATENT DOCUMENTS

| | | |
|---|---|---|
| EP | 1 852 984 | 11/2007 |
| JP | 2007-195179 | 8/2007 |
| KR | 10-2007-0027053 | 3/2007 |
| KR | 10-2007-0050707 | 5/2007 |
| KR | 10-2008-0017629 | 2/2008 |
| KR | 10-2008-0020241 | 3/2008 |
| KR | 10-2008-0038071 | 5/2008 |
| KR | 10-2008-0078139 | 8/2008 |
| KR | 10-2008-0090031 | 10/2008 |

OTHER PUBLICATIONS

J. N. Laneman and G. W. Wornell, "Distributed space-time-coded protocols for exploiting cooperative diversity in wireless networks," IEEE Trans. Inform. Theory, vol. 49, No. 10, pp. 2415-2425, Oct. 2003.

A. Bletsas, A. Khisti, D. P. Reed, and A. Lippman, "A simple cooperative diversity method based on network path selection," IEEE J. Select. Areas Commun., vol. 24, No. 3, pp. 659-672, Mar. 2006.

* cited by examiner

*Primary Examiner* — Hanh Nguyen
(74) *Attorney, Agent, or Firm* — NSIP Law

(57) ABSTRACT

A terminal device and a relay node selection method of the terminal device are described. The terminal device may sequentially compare a threshold value and an output signal to noise ratio (SNR) of a plurality of relay nodes based on a set test order, and select a relay node having an output SNR greater than the threshold value as a relay node to perform a cooperative communication.

13 Claims, 3 Drawing Sheets

TERMINAL DEVICE AND RELAY NODE SELECTION METHOD OF TERMINAL DEVICE

CROSS-REFERENCE TO RELATED APPLICATION(S)

This application claims the benefit under 35 U.S.C. §119 (a) of a Korean Patent Application No. 10-2009-0022661, filed on Mar. 17, 2009, in the Korean Intellectual Property Office, the entire disclosure of which is incorporated herein by reference for all purposes.

BACKGROUND

1. Field

The following description relates to a terminal device and a relay node selection method of the terminal device.

2. Description of the Related Art

Recently, a cooperative diversity system based on a distributed space-time coding (DSTC) to provide a spatial diversity gain in a wireless network has become the focus of attention.

Networking theories associated with a communication environment where a plurality of transmitting/receiving devices exists have been proposed since the early 1990s. As a variety of wireless network environments has been practically developed, networking theories for particular applications have been embodied.

A DSTC-based cooperative diversity system may have a superior link performance among nodes. Accordingly, DSTC schemes using spatial diversity based on an alamouti space time block code have been proposed. However, since such schemes may use a plurality of nodes between a source node and a destination node as relay nodes, system complexity may increase. Here, the source node may transmit data and the destination node may receive the data.

Another relay transmission system which may select an optimum relay node from a plurality of relay nodes to enable a source node and a destination node to perform communication through an optimum channel has been proposed. However, while such a relay transmission system may prevent excessive power consumption and provide a diversity gain, since a channel state between each relay node and a source node and a channel state between each relay node and a destination node are measured to select a relay node, system complexity may increase.

SUMMARY

In one general aspect, a terminal device includes an order setting unit to set a test order of a plurality of relay nodes, a measurement unit to measure an output signal to noise ratio (SNR) of a leading relay node from among the plurality of relay nodes based on the test order, and a selection unit to compare the output SNR and a threshold value, and select the leading relay node as a relay node to perform a cooperative communication in response to the output SNR being greater than the threshold value. The measurement unit may measure an output SNR of a subsequent relay node based on the test order in response to the output SNR of the leading relay node being equal to or less than the threshold value, and the selection unit may compare the output SNR of the subsequent relay node and the threshold value and selects the subsequent relay node as the relay node to perform the cooperative communication in response to the output SNR of the subsequent relay node being greater than the threshold value.

The threshold value may be a maximum constellation size.

The selection unit may select a relay node having a maximum output SNR from among the plurality of relay nodes, as the relay node to perform the cooperative communication, in response to a relay node having an output SNR greater than the maximum constellation size not existing among the plurality of relay nodes.

In response to a relay node having an output SNR greater than the maximum constellation size not existing among the plurality of relay nodes, the selection unit may compare a minimum constellation size and a maximum output SNR from among a plurality of output SNRs of the plurality of relay nodes, and discontinue communication in response to the maximum output SNR being equal to or less than the minimum constellation size.

The threshold value may be a minimum constellation size.

The selection unit may discontinue communication in response to a relay node having an output SNR greater than the minimum constellation size not existing among the plurality of relay nodes.

In another general aspect, a relay node selection method of a terminal device, includes setting a test order of a plurality of relay nodes, measuring an output SNR of a leading relay node from among the plurality of relay nodes based on the test order, comparing the output SNR and a threshold value, and determining whether the output SNR is greater than the threshold value, selecting the leading relay node as a relay node to perform a cooperative communication in response to the output SNR being greater than the threshold value, and in response to the output SNR being equal to or less than the threshold value: measuring an output SNR of a subsequent relay node based on the test order; comparing the output SNR of the subsequent relay node and the threshold value, and determining whether the output SNR of the subsequent relay node is greater than the threshold value; and selecting the subsequent relay node as the relay node to perform the cooperative communication in response to the output SNR of the subsequent relay node being greater than the threshold value.

The threshold value may be a maximum constellation size.

The relay node selection method may further include selecting a relay node having a maximum output SNR from among the plurality of relay nodes, as the relay node to perform the cooperative communication, in response to a relay node having an output SNR greater than the maximum constellation size not existing among the plurality of relay nodes.

The relay node selection method may further include, in response to a relay node having an output SNR greater than the maximum constellation size not existing among the plurality of relay nodes, comparing a minimum constellation size and a maximum output SNR from among a plurality of output SNRs of the plurality of relay nodes, and discontinuing communication in response to the maximum output SNR being equal to or less than the minimum constellation size.

The threshold value may be a minimum constellation size.

The relay node selection method may further include discontinuing communication in response to a relay node having an output SNR greater than the minimum constellation size not existing among the plurality of relay nodes.

Other features and aspects will be apparent from the following detailed description, the drawings, and the claims.

Figure 1:
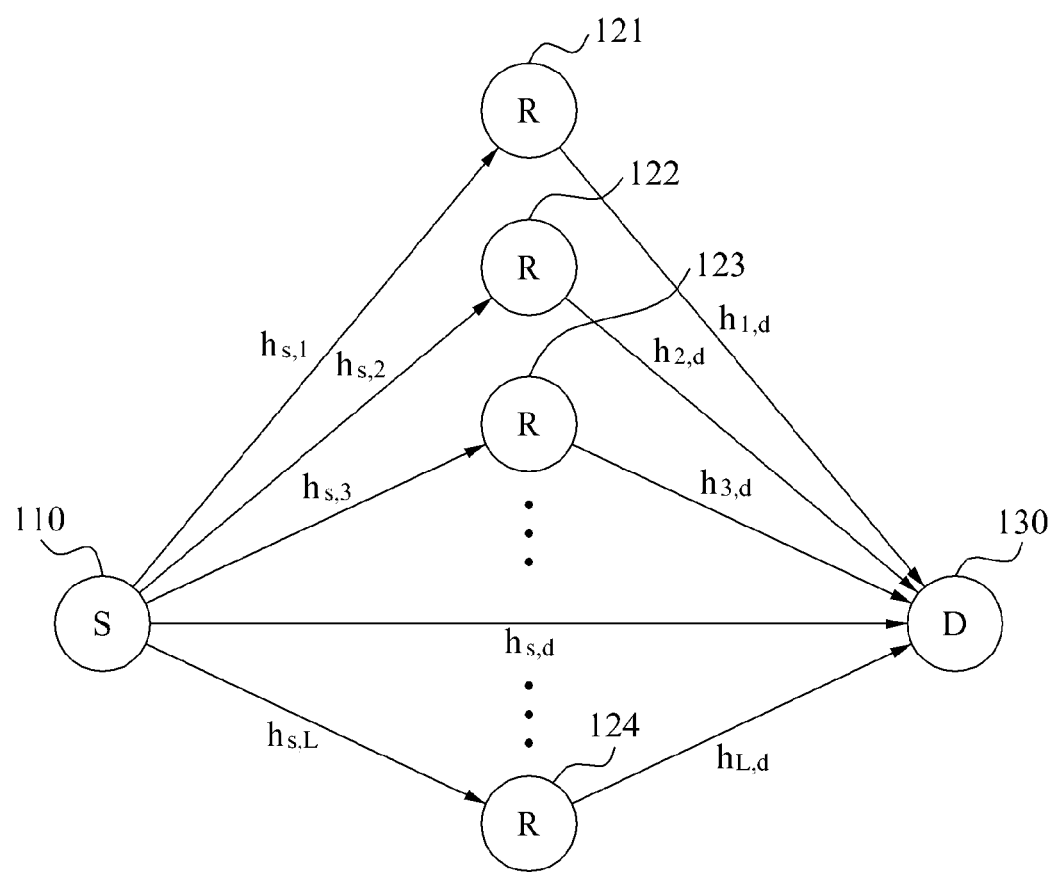
FIG. 1 is a diagram illustrating an exemplary communication system.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the media, apparatuses, methods and/or systems described herein. Accordingly, various changes, modifications, and equivalents of the systems, methods, apparatuses and/or media described herein will be suggested to those of ordinary skill in the art. Also, descriptions of well-known functions and constructions may be omitted for increased clarity and conciseness.

In a cooperative communication system, a terminal device may confirm channel state information of a plurality of relay nodes, and select a relay node having an optimum channel state from the plurality of relay nodes as a relay node to perform a cooperative communication, based on the channel state information.

That is, the terminal device may confirm all the channel state information of the plurality of relay nodes to select the relay node to perform a cooperative communication.

In the above-described relay node selection method, since the terminal device confirms all the channel state information of the plurality of relay nodes, system complexity due to a load caused by channel measurements and also due to power consumption, may increase.

Accordingly, a terminal device is provided that may sequentially confirm channel state information of a plurality of relay nodes in a cooperative communication system, and select a relay node having a channel state equal to or greater than a threshold value.

Hereinafter, such a terminal device is further described with reference to FIGS. 1 and 2.

FIG. 1 illustrates an exemplary communication system having a source node 110, a plurality of relay nodes 121, 122, 123, and 124, and a terminal device 130.

Here, the source node 110 may indicate a device transmitting data. The source node 110 may transmit the data to the terminal device 130 and each of the plurality of relay nodes 121, 122, 123, and 124. The source node 110 may perform a communication with the terminal device 130 through a channel $h_{s,d}$ between the source node 110 and the terminal device 130. Also, the source node 110 may perform a communication with each of the plurality of relay nodes 121, 122, 123, and 124 through each channel $h_{s,1}, h_{s,2}, h_{s,3}, \ldots, h_{S,L}$ between the source node 110 and each of the plurality of relay nodes 121, 122, 123, and 124.

Each of the plurality of relay nodes 121, 122, 123, and 124 may perform a relaying function through the channels $h_{s,1}, h_{s,2}, h_{s,3}, \ldots, h_{s,L}$ and channels $h_{1,d}, h_{2,d}, h_{3,d}, \ldots, h_{L,d}$ between the terminal device 130 and each of the plurality of relay nodes 121, 122, 123, and 124.

The terminal device 130 may receive the data, and select a relay node to perform a cooperative communication from the plurality of relay nodes 121, 122, 123, and 124. Also, the terminal device 130 may combine information transmitted from the source node 110 and the selected relay node, and modulate the data.

As an example, a communication system may perform communication using an adaptive modulation scheme.

Also, a communication system may perform communication using two time slots. In a first time slot, the source node 110 may transmit information to the terminal device 130 and the plurality of relay nodes 121, 122, 123, and 124. In a second time slot, only a relay node selected by the terminal device 130 may transmit information to the terminal device 130. Also, the terminal device 130 may obtain final data using a maximum ratio combining (MRC) scheme to maximize information obtained during the two time slots.

A method where the terminal device 130 selects the relay node to perform a cooperative communication from the plurality of relay nodes 121, 122, 123, and 124 will be further explained with two exemplary implementations. According to one exemplary implementation, a relay node selection method of the terminal device 130 may achieve a maximum spectral efficiency. According to another exemplary implementation, a relay node selection method of the terminal device 130 may correspond to a minimum relay probing scheme.

Referring to FIG. 1, an exemplary replay node selection method to achieve maximum spectral efficiency is further described below.

A source node 110 may transmit a pilot symbol to a terminal device 130 and a plurality of relay nodes 121, 122, 123, and 124 to measure a channel state during a guard period.

Also, the terminal device 130 may set a test order with respect to the plurality of relay nodes 121, 122, 123, and 124, and sequentially measure an output signal to noise ratio (SNR) of each of the plurality of relay nodes 121, 122, 123, and 124 based on the set test order.

In this case, an output SNR that the terminal device 130 may obtain through an $i^{th}$ relay node from the plurality of relay nodes 121, 122, 123, and 124 may be represented by the following Equation 1:

$$\gamma_i = \gamma_{s,d} + \frac{\gamma_{s,i}\gamma_{i,d}}{\gamma_{s,i} + \gamma_{i,d} + 1}. \qquad [\text{Equation 1}]$$

$$\text{Here, } \gamma_{x,y} = \frac{|h_{x,y}|^2}{N_0}.$$

Here, $N_0$ may denote a noise distribution value.

Hereinafter, an operation where the terminal device 130 selects the relay node to perform a cooperative communication is further described.

As an illustration, it may be assumed that the terminal device 130 sets the test order in an order from the relay node (1) 121, the relay node (2) 122, the relay node (3) 123, and the like with respect to the plurality of relay nodes 121, 122, 123, and 124.

The terminal device 130 may measure the output SNR represented in Equation 1 with respect to the relay node (1) 121, hereinafter, referred to as "first output SNR." Also, the terminal device 130 may compare the measured first output SNR and a maximum constellation size.

When the measured first output SNR is greater than the maximum constellation size, the terminal device 130 may select the relay node (1) 121 as the relay node to perform the cooperative communication.

However, when the measured first output SNR is equal to or less than the maximum constellation size, the terminal device 130 may measure an output SNR of the relay node (2) 122, hereinafter, referred to as "second output SNR," and compare the measured second output SNR and the maximum constellation size.

When the measured second output SNR is greater than the maximum constellation size, the terminal device 130 may select the relay node (2) 122 as the relay node to perform the cooperative communication.

However, when the measured second output SNR is equal to or less than the maximum constellation size, the terminal device 130 may measure an output SNR of the relay node (3) 123, hereinafter, referred to as "third output SNR," and compare the measured third output SNR and the maximum constellation size.

When the measured third output SNR is greater than the maximum constellation size, the terminal device 130 may select the relay node (3) 123 as the relay node to perform cooperative communication.

However, when even the measured third output SNR is equal to or less than the maximum constellation size, the terminal device 130 may measure an output SNR of a relay node subsequent to the relay node (3) 123 based on the test order, and compare the measured output SNR and the maximum constellation size.

That is, the terminal device 130 may set the test order with respect to the plurality of relay nodes 121, 122, 123, and 124, and sequentially compare the maximum constellation size and the output SNR of each of the plurality of relay nodes 121, 122, 123, and 124 based on the set test order.

The terminal device 130 may sequentially measure the output SNR of each of the plurality of relay nodes 121, 122, 123, and 124. However, when an output SNR of a currently compared relay node is greater than the maximum constellation size, the terminal device 130 may select the currently compared relay node without measuring output SNRs of the remaining relay nodes. Accordingly, the terminal device 130 may not measure the output SNRs of all the relay nodes 121, 122, 123, and 124 to select the relay node to perform the cooperative communication.

Accordingly, the above described exemplary method and terminal device 130 may reduce the system complexity when selecting the relay node to perform the cooperative communication.

Also, the terminal device 130 may compare the maximum constellation size and the output SNR of each of the plurality of relay nodes 121, 122, 123, and 124, and select a relay node having an output SNR greater than the maximum constellation size as the relay node to perform the cooperative communication.

Accordingly, a maximum spectral efficiency may be obtained.

When the terminal device 130 sequentially compares the maximum constellation size and the output SNR of each of the plurality of relay nodes 121, 122, 123, and 124, and selects a single relay node, the source node 110 may modulate data depending on the maximum constellation size and transmit the data to the terminal device 130 and the selected single relay node.

When the relay node having the output SNR greater than the maximum constellation size does not exist as a result of comparing the maximum constellation size with the output SNR of each of the plurality of relay nodes 121, 122, 123, and 124, the terminal device 130 may compare the output SNRs of the plurality of relay nodes 121, 122, 123, and 124 to each other. Here, the output SNRs of the plurality of relay nodes 121, 122, 123, and 124 have been measured during the comparing operation with respect to the maximum constellation size. The terminal device 130 may select a relay node having the maximum output SNR from among the plurality of relay nodes 121, 122, 123, and 124, as the relay node to perform the cooperative communication.

In this case, the terminal device 130 may compare the selected maximum output SNR and a minimum constellation size. When the selected maximum output SNR is equal to or less than the minimum constellation size, the terminal device 130 may not perform the communication. That is, the selected maximum output SNR being equal to or less than the minimum constellation size may indicate that a channel state of the plurality of relay nodes 121, 122, 123, and 124 are unsuitable. Accordingly, the terminal device 130 may not perform the communication, which may be referred to as an outage.

When the selected maximum output SNR is greater than the minimum constellation size, the source node 110 may determine an appropriate constellation size based on the maximum output SNR, and modulate data depending on the determined constellation size. Thereafter, the source node 110 may transmit the modulated data to the terminal device 130 and the relay node having the maximum output SNR.

For example, when an output SNR of the relay node (2) 122 from among the plurality of relay nodes 121, 122, 123, and 124 is measured as the maximum output SNR, the terminal device 130 may compare the output SNR of the relay node (2) 122 and the minimum constellation size.

When the output SNR of the relay node (2) 122 is greater than the minimum constellation size, the terminal device 130 may select the relay node (2) 122 as the relay node to perform the cooperative communication.

Also, the source node 110 may determine an appropriate constellation size based on the output SNR of the relay node (2) 122, and modulate data depending on the determined constellation size. Thereafter, the source node 110 may transmit the modulated data to the terminal device 130 and the relay node (2) 122.

However, the output SNR of the relay node (2) 122 being equal to or less than the minimum constellation size may indicate that the channel state of the plurality of relay nodes 121, 122, 123, and 124 are unsuitable. Accordingly, the terminal device 130 may not perform the communication.

The exemplary implementation described above may be referred to as a maximum spectral efficiency scheme (MSES), since the maximum spectral efficiency may be obtained by sequentially comparing the maximum constellation size and the output SNR of each of the plurality of relay nodes 121, 122, 123, and 124.

Referring to FIG. 1, another exemplary replay node selection method for minimum relay probing is further described below.

A terminal device 130 may sequentially measure an output SNR of each of a plurality of relay nodes 121, 122, 123, and 124, and compare a predetermined threshold value with the output SNR to select a relay node having an output SNR greater than the threshold value as a relay node to perform a cooperative communication.

However, in this implementation, the output SNR of each of the plurality of relay nodes 121, 122, 123, and 124 may be sequentially compared with a minimum constellation size, as opposed to a maximum constellation size.

As an illustration, it may be assumed that the terminal device 130 sets a test order in an order from the relay node (1) 121, the relay node (2) 122, the relay node (3) 123, and the like, with respect to the plurality of relay nodes 121, 122, 123, and 124.

The terminal device 130 may measure the output SNR as represented in Equation 1 with respect to the relay node (1) 121, referred to as "first output SNR," and compare the measured first output SNR and the minimum constellation size.

When the measured first output SNR is greater than the minimum constellation size, the terminal device 130 may select the relay node (1) 121 as the relay node to perform the cooperative communication.

However, when the measured first output SNR is equal to or less than the minimum constellation size, the terminal device 130 may measure an output SNR of the relay node (2) 122, referred to as "second output SNR," and compare the measured second output SNR and the minimum constellation size.

When the measured second output SNR is greater than the minimum constellation size, the terminal device 130 may select the relay node (2) 122 as the relay node to perform the cooperative communication.

However, when the measured second output SNR is equal to or less than the minimum constellation size, the terminal device 130 may measure an output SNR of the relay node (3) 123, referred to as "third output SNR," and compare the measured third output SNR and the minimum constellation size.

When the measured third output SNR is greater than the minimum constellation size, the terminal device 130 may select the relay node (3) 123 as the relay node to perform the cooperative communication.

However, when even the measured third output SNR is equal to or less than the minimum constellation size, the terminal device 130 may measure an output SNR of a relay node subsequent to the relay node (3) 123 based on the test order, and compare the measured output SNR and the minimum constellation size.

That is, the terminal device 130 may set the test order with respect to the plurality of relay nodes 121, 122, 123, and 124, and sequentially compare the minimum constellation size and the output SNR of each of the plurality of relay nodes 121, 122, 123, and 124 based on the set test order.

The terminal device 130 may sequentially measure the output SNR of each of the plurality of relay nodes 121, 122, 123, and 124. Accordingly, when an output SNR of a currently compared relay node is greater than the minimum constellation size, the terminal device 130 may select the currently compared relay node without measuring output SNRs of the remaining relay nodes. Thus, the terminal device 130 may not measure the output SNRs of all the relay nodes 121, 122, 123, and 124 to select the relay node to perform the cooperative communication.

Accordingly, system complexity may be reduced when selecting the relay node to perform the cooperative communication.

Also, the terminal device 130 may compare the output SNR of each of the plurality of relay nodes 121, 122, 123, and 124 with the minimum constellation size, which may be a minimum condition to perform the cooperative communication, and thus a number of relay probing operations for a relay node selection may be minimized.

When the terminal device 130 sequentially compares the minimum constellation size with the output SNR of each of the plurality of relay nodes 121, 122, 123, and 124, and selects a single relay node, the source node 110 may modulate data depending on the minimum constellation size and transmit the data to the terminal device 130 and the selected single relay node.

When a relay node having an output SNR greater than the minimum constellation size does not exist as a result of comparing the minimum constellation size and the output SNR of each of the plurality of relay nodes 121, 122, 123, and 124, the terminal device 130 may not perform the communication. That is, when a relay node having an output SNR greater than the minimum constellation size does not exist, this may indicate that a channel state of the relay nodes 121, 122, 123, and 124 are unsuitable. Accordingly, the terminal device 130 may not perform the communication, which may be referred to as an outage.

Another exemplary implementation described above may be referred to as a minimum relay probing scheme (MRPS), since a relay node probing operation may be minimized by sequentially comparing the minimum constellation size and the output SNR of each of the plurality of relay nodes 121, 122, 123, and 124.

Figure 2:
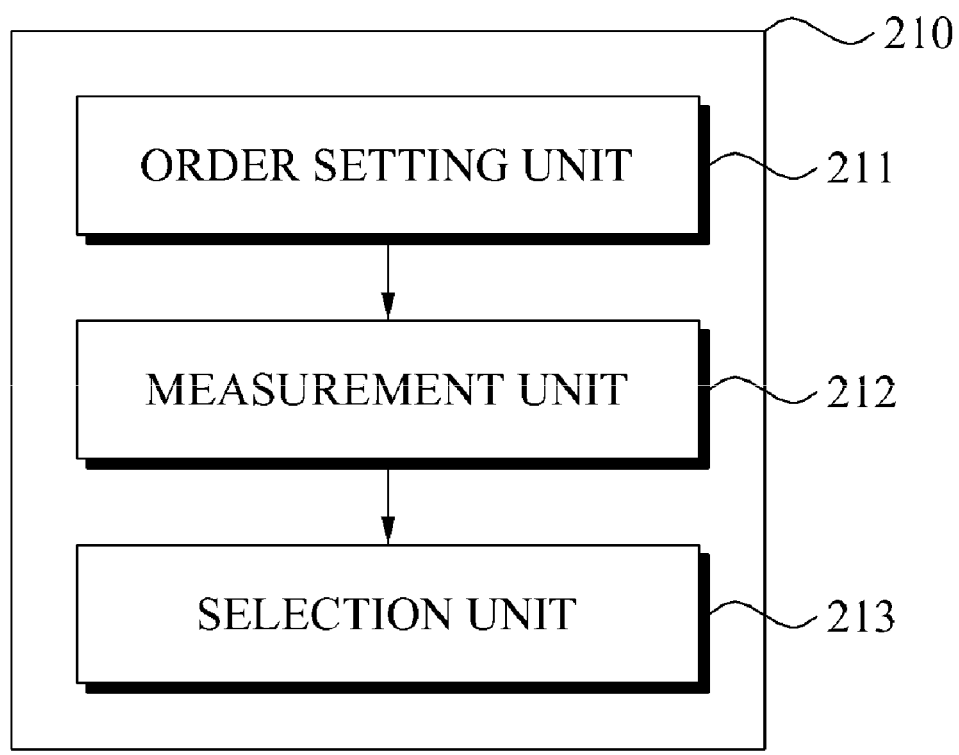
FIG. 2 is a block diagram illustrating an exemplary terminal device.

FIG. 2 illustrates an exemplary terminal device 210 that may perform the exemplary method(s) described above. The terminal device 210 includes an order setting unit 211, a measurement unit 212, and a selection unit 213.

The order setting unit 211 may set a test order of a plurality of relay nodes.

The measurement unit 212 may measure an output SNR of a leading relay node from among the plurality of relay nodes based on the test order.

The selection unit 213 may compare the output SNR and a threshold value. When the output SNR is greater than the threshold value, the selection unit 213 may select the leading relay node as a relay node to perform a cooperative communication.

However, when the output SNR is equal to or less than the threshold value, the measurement unit 212 may measure an output SNR of a subsequent relay node based on the test order.

The output SNR of the subsequent relay node may be compared with the threshold value, and when the output SNR of the subsequent relay node is greater than the threshold value, the subsequent relay node may be selected as the relay node to perform the cooperative communication.

For example, the threshold value may be a maximum constellation size.

In this case, when a relay node having an output SNR greater than the maximum constellation size does not exist among the plurality of relay nodes, the selection unit 213 may select a relay node having a maximum output SNR from among the plurality of relay nodes, as the relay node to perform the cooperative communication.

Also, when the relay node having the output SNR greater than the maximum constellation size does not exist among the plurality of relay nodes, the selection unit 213 may compare a minimum constellation size and the maximum output SNR. When the maximum output SNR is equal to or less than the minimum constellation size, the selection unit 213 may discontinue communication of the terminal device 210.

As another example, the threshold value may be a minimum constellation size.

In this case, when a relay node having an output SNR greater than the minimum constellation size does not exist among the plurality of relay nodes, the selection unit 213 may discontinue the communication of the terminal device 210.

Figure 3:
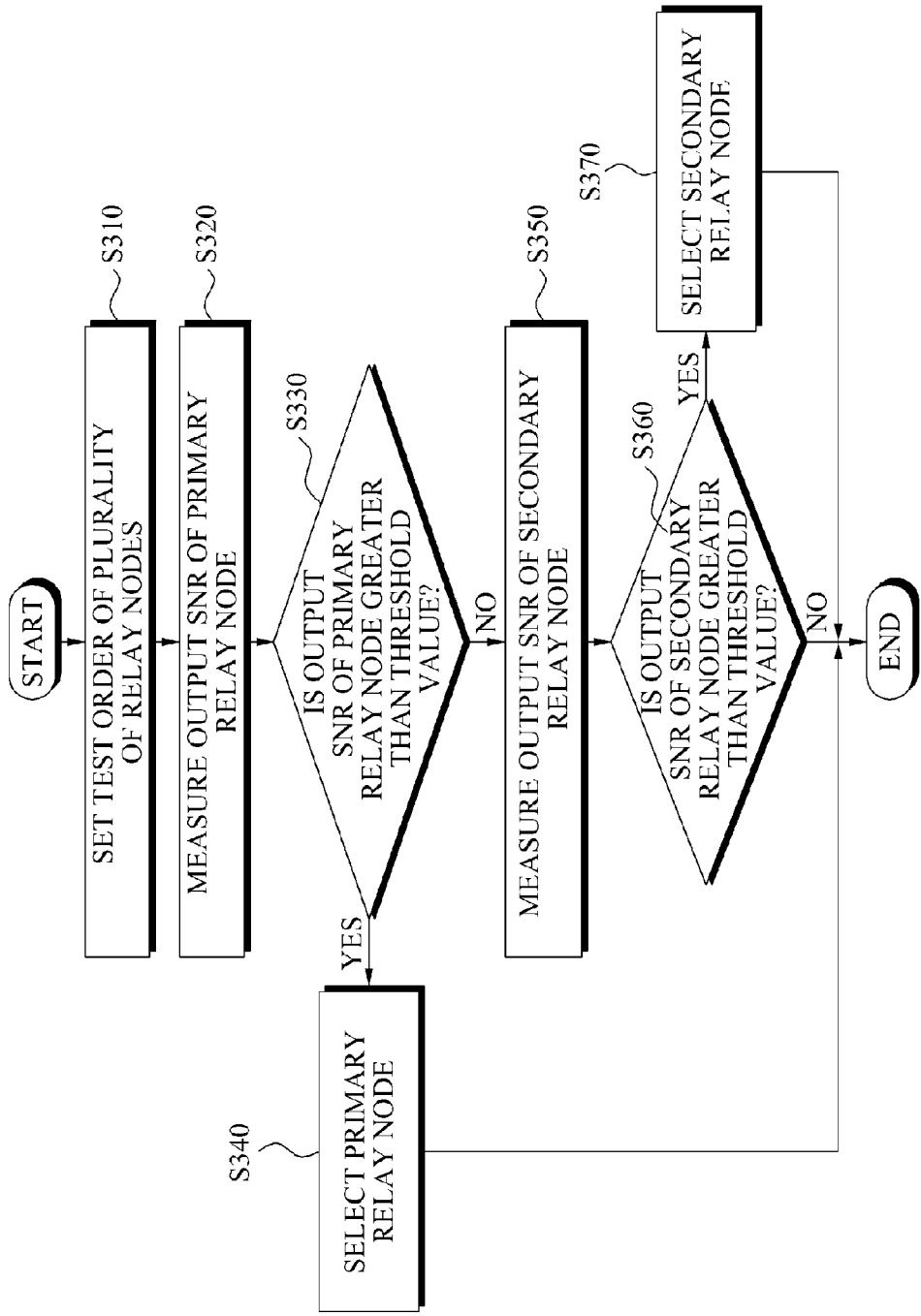
FIG. 3 is a flowchart illustrating an exemplary relay node selection method of a terminal device.

FIG. 3 shows a flowchart illustrating an exemplary relay node selection method of a terminal device. For example, with reference to FIG. 1, the terminal device 210 of FIG. 2 may perform the method.

In operation S310, a test order of a plurality of relay nodes is set.

In operation S320, an output SNR of a leading relay node from among the plurality of relay nodes is measured based on the test order.

In operation S330, the output SNR and a threshold value is compared, and it is determined whether the output SNR is greater than the threshold value.

When it is determined that the output SNR is greater than the threshold value in operation S330, the leading relay node is selected as a relay node to perform a cooperative communication in operation S340.

When it is determined that the output SNR is equal to or less than the threshold value in operation S330, an output SNR of the subsequent relay node is measured based on the test order in operation S350.

In operation S360, the output SNR of the subsequent relay node and the threshold value is compared, and it is determined whether the output SNR of the subsequent relay node is greater than the threshold value.

When it is determined that the output SNR of the subsequent relay node is greater than the threshold value in operation S360, the subsequent relay node is selected as the relay node to perform the cooperative communication in operation S370.

While FIG. 3 shows that the exemplary method ends following operation S360, it is understood that the method may include further operations to select a relay node as described above with reference to FIGS. 1 and 2.

The threshold value may be the maximum constellation size.

In this case, when a relay node having an output SNR greater than the maximum constellation size does not exist among the plurality of relay nodes, while not illustrated, an operation of selecting a relay node having a maximum output SNR from the plurality of relay nodes, as the relay node to perform the cooperative communication, may be further included after operation S360.

Also, when the relay node having the output SNR greater than the maximum constellation size does not exist among the plurality of relay nodes, while not illustrated, an operation of comparing a minimum constellation size and the maximum output SNR from among the output SNRs of the plurality of relay nodes may be further included after operation S360.

When the maximum output SNR is equal to or less than the minimum constellation size, while not illustrated, an operation of discontinuing the communication of the terminal device may be further included.

The threshold value may be the minimum constellation size.

In this case, when a relay node having an output SNR greater than the minimum constellation size does not exist among the plurality of relay nodes, while not illustrated, an operation of discontinuing the communication of the terminal device may be further included after operation S360.

The above-described methods may be recorded, or fixed in one or more computer-readable storage media that includes program instructions to be implemented by a computer to cause a processor to execute or perform the program instructions. The media may also include, independent or in combination with the program instructions, data files, data structures, and the like. Examples of computer-readable media may include magnetic media such as hard disks, floppy disks, and magnetic tape; optical media such as CD ROM disks and DVDs; magneto-optical media such as optical disks; and hardware devices that are specially configured to store and perform program instructions, such as read-only memory (ROM), random access memory (RAM), flash memory, and the like Examples of program instructions include both machine code, such as produced by a compiler, and files containing higher level code that may be executed by the computer using an interpreter. The described hardware devices may be configured to act as one or more software modules in order to perform the methods and/or operations described above, or vice versa. In addition, a computer-readable storage medium may be distributed among computer systems connected through a network and computer-readable codes or program instructions may be stored and executed in a decentralized manner.

According to example(s) described above, a terminal device may sequentially confirm channel state information of a plurality of relay nodes in a cooperative communication system, select a relay node having a channel state equal to or greater than a threshold value, or greater than the threshold value.

As a non-exhaustive illustration only, the terminal device described herein may refer to mobile devices such as a cellular phone, a personal digital assistant (PDA), a digital camera, a portable game console, and an MP3 player, a portable/personal multimedia player (PMP), a handheld e-book, a portable lab-top PC, a global positioning system (GPS) navigation, and devices such as a desktop PC, a high definition television (HDTV), an optical disc player, a setup box, and the like capable of wireless communication or network communication consistent with that disclosed herein.

A number of exemplary embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A terminal device, comprising:
   an order setting unit to set a test order of a plurality of relay nodes;
   a measurement unit to measure an output signal to noise ratio (SNR) of a leading relay node from among the plurality of relay nodes based on the test order; and
   a selection unit to compare the output SNR and a threshold value, and select the leading relay node as a relay node to perform a cooperative communication in response to the output SNR being greater than the threshold value,
   wherein the measurement unit measures an output SNR of a subsequent relay node based on the test order in response to the output SNR of the leading relay node being equal to or less than the threshold value, and the selection unit compares the output SNR of the subsequent relay node and the threshold value and selects the subsequent relay node as the relay node to perform the cooperative communication in response to the output SNR of the subsequent relay node being greater than the threshold value; and
   wherein in response to the relay node being selected, the remaining relay nodes are discontinued to be measured.

2. The terminal device of claim 1, wherein the threshold value is a maximum constellation size.

3. The terminal device of claim 2, wherein the selection unit selects a relay node having a maximum output SNR from among the plurality of relay nodes, as the relay node to perform the cooperative communication, in response to a relay node having an output SNR greater than the maximum constellation size not existing among the plurality of relay nodes.

4. The terminal device of claim 1, wherein the threshold value is a minimum constellation size.

5. The terminal device of claim 4, wherein the selection unit discontinues communication in response to a relay node having an output SNR greater than the minimum constellation size not existing among the plurality of relay nodes.

6. A terminal device, comprising:
an order setting unit to set a test order of a plurality of relay nodes;
a measurement unit to measure an output signal to noise ratio (SNR) of a leading relay node from among the plurality of relay nodes based on the test order; and
a selection unit to compare the output SNR and a threshold value, and select the leading relay node as a relay node to perform a cooperative communication in response to the output SNR being greater than the threshold value,
wherein the measurement unit measures an output SNR of a subsequent relay node based on the test order in response to the output SNR of the leading relay node being equal to or less than the threshold value, and the selection unit compares the output SNR of the subsequent relay node and the threshold value and selects the subsequent relay node as the relay node to perform the cooperative communication in response to the output SNR of the subsequent relay node being greater than the threshold value;
wherein the threshold value is a maximum constellation size; and
wherein, in response to a relay node having an output SNR greater than the maximum constellation size not existing among the plurality of relay nodes, the selection unit compares a minimum constellation size and a maximum output SNR from among a plurality of output SNRs of the plurality of relay nodes, and discontinues communication in response to the maximum output SNR being equal to or less than the minimum constellation size.

7. A relay node selection method of a terminal device, the method comprising:
setting a test order of a plurality of relay nodes;
measuring an output SNR of a leading relay node from among the plurality of relay nodes based on the test order;
comparing the output SNR and a threshold value, and determining whether the output SNR is greater than the threshold value;
selecting the leading relay node as a relay node to perform a cooperative communication in response to the output SNR being greater than the threshold value; and
in response to the output SNR being equal to or less than the threshold value:
measuring an output SNR of a subsequent relay node based on the test order;
comparing the output SNR of the subsequent relay node and the threshold value, and determining whether the output SNR of the subsequent relay node is greater than the threshold value; and
selecting the subsequent relay node as the relay node to perform the cooperative communication in response to the output SNR of the subsequent relay node being greater than the threshold value,
wherein the setting, the measuring, the comparing, the selecting, or any combination thereof is performed by a processor; and
wherein in response to the selecting of the leading relay node, the remaining relay nodes are discontinued to be measured.

8. The relay node selection method of claim 7, wherein the threshold value is a maximum constellation size.

9. The relay node selection method of claim 8, further comprising:
selecting a relay node having a maximum output SNR from among the plurality of relay nodes, as the relay node to perform the cooperative communication, in response to a relay node having an output SNR greater than the maximum constellation size not existing among the plurality of relay nodes.

10. The relay node selection method of claim 7, wherein the threshold value is a minimum constellation size.

11. The relay node selection method of claim 10, further comprising:
discontinuing communication in response to a relay node having an output SNR greater than the minimum constellation size not existing among the plurality of relay nodes.

12. A relay node selection method of a terminal device, the method comprising:
setting a test order of a plurality of relay nodes;
measuring an output SNR of a leading relay node from among the plurality of relay nodes based on the test order;
comparing the output SNR and a threshold value, and determining whether the output SNR is greater than the threshold value;
selecting the leading relay node as a relay node to perform a cooperative communication in response to the output SNR being greater than the threshold value; and
in response to the output SNR being equal to or less than the threshold value:
measuring an output SNR of a subsequent relay node based on the test order;
comparing the output SNR of the subsequent relay node and the threshold value, and determining whether the output SNR of the subsequent relay node is greater than the threshold value; and
selecting the subsequent relay node as the relay node to perform the cooperative communication in response to the output SNR of the subsequent relay node being greater than the threshold value; and
in response to a relay node having an output SNR greater than the maximum constellation size not existing among the plurality of relay nodes:
comparing a minimum constellation size and a maximum output SNR from among a plurality of output SNRs of the plurality of relay nodes; and discontinuing communication in response to the maximum output SNR being equal to or less than the minimum constellation size, wherein the threshold value is a maximum constellation size, and the setting, the measuring, the comparing, the selecting, or any combination thereof is performed by a processor.

13. A non-transitory computer-readable storage medium storing a program to selecting a relay node, comprising instructions to cause a computer to:
set a test order of a plurality of relay nodes;
measure an output SNR of a leading relay node from among the plurality of relay nodes based on the test order;
compare the output SNR and a threshold value, and determine whether the output SNR is greater than the threshold value;
select the leading relay node as a relay node to perform cooperative communication in response to the output SNR being greater than the threshold value; and in response to the output SNR being equal to or less than the threshold value:

measure an output SNR of a subsequent relay node based on the test order;

compare the output SNR of the subsequent relay node and the threshold value, and determine whether the output SNR of the subsequent relay node is greater than the threshold value; and select the subsequent relay node as the relay node to perform the cooperative communication in response to the output SNR of the subsequent relay node being greater than the threshold value, wherein in response to the selection of the leading relay node, the remaining relay nodes are discontinued to be measured.

* * * * *